United States Patent
Choi et al.

(10) Patent No.: US 7,645,402 B2
(45) Date of Patent: Jan. 12, 2010

(54) DISPERSANT FOR DISPERSING NANOPARTICLES IN AN EPOXY RESIN, METHOD FOR DISPERSING NANOPARTICLES USING THE SAME, AND NANOPARTICLE-CONTAINING THIN FILM COMPRISING THE SAME

(75) Inventors: Seong Jae Choi, Seoul (KR); Jae Ho Lee, Yongin-si (KR); Jae Young Choi, Suwon-si (KR); Eun Sung Lee, Seoul (KR); Don Ik Lee, Icheon-si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 414 days.

(21) Appl. No.: 11/512,967

(22) Filed: Aug. 30, 2006

(65) Prior Publication Data

US 2007/0112101 A1     May 17, 2007

(30) Foreign Application Priority Data

Nov. 16, 2005    (KR) ..................... 10-2005-0109607

(51) Int. Cl.
*H01B 1/20*     (2006.01)
(52) U.S. Cl. ............................ 252/519.34; 252/519.33; 252/519.4; 252/519.5; 252/518.1; 252/500
(58) Field of Classification Search ................. 510/506; 252/519.5, 520.1, 520.2, 520.5, 521.1, 518.1, 252/519.34, 519.33, 519.4, 500, 519.3
See application file for complete search history.

(56) References Cited

U.S. PATENT DOCUMENTS

| | | | |
|---|---|---|---|
| 6,444,143 B2 * | 9/2002 | Bawendi et al. | 252/301.6 S |
| 6,846,565 B2 * | 1/2005 | Korgel et al. | 428/402 |
| 2005/0074551 A1 | 4/2005 | Huang et al. | 427/212 |
| 2006/0205059 A1 * | 9/2006 | Esfandiari | 435/287.2 |
| 2007/0157852 A1 * | 7/2007 | Lee et al. | 106/278 |
| 2007/0295957 A1 * | 12/2007 | Lee et al. | 257/40 |
| 2008/0206562 A1 * | 8/2008 | Stucky et al. | 428/403 |
| 2009/0123365 A1 * | 5/2009 | Yang et al. | 424/1.11 |

OTHER PUBLICATIONS

Ghosh et al., "Studies of the evolution of silver nanoparticles in micelle by UV-photoactivation", Journal of Nanoparticle Research, 5 (2003), 577-567.*
Reg. No. 9002-93-1, Nov. 16, 1984.*
Reg. No. 9004-98-2, Nov. 16, 1984.*
Reg. No. 9005-00-9, Nov. 16, 1984.*
Reg. No. 9016-45-9, Nov. 16, 1984.*

* cited by examiner

*Primary Examiner*—Douglas Mc Ginity
(74) *Attorney, Agent, or Firm*—Cantor Colburn LLP

(57) ABSTRACT

Disclosed herein are a dispersant for dispersing nanoparticles that are surface-bound with capping ligands in a polymer matrix having an epoxide group, a method for dispersing the nanoparticles using the dispersant, and a nanoparticle-containing thin film including the dispersant.

28 Claims, 7 Drawing Sheets

Comparative Example 1    Example 1    Epoxy 100 nm

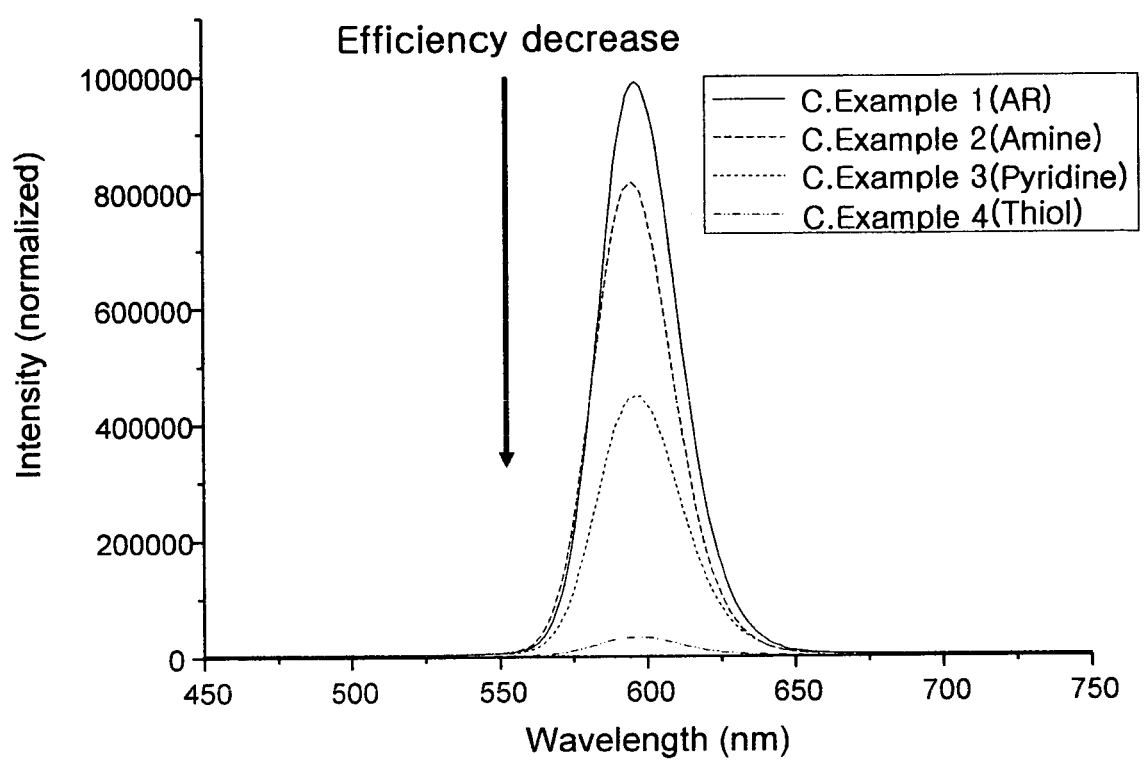

DISPERSANT FOR DISPERSING NANOPARTICLES IN AN EPOXY RESIN, METHOD FOR DISPERSING NANOPARTICLES USING THE SAME, AND NANOPARTICLE-CONTAINING THIN FILM COMPRISING THE SAME

This non-provisional application claims priority to Korean Patent Application No. 2005-109607, filed on Nov. 16, 2005, and all the benefits accruing therefrom under 35 U.S.C. § 119(a), the contents of which are herein incorporated by reference in its entirety.

BACKGROUND OF THE INVENTION

1. Field of the Invention

The present invention relates to a dispersant for dispersing nanoparticles in an epoxy resin, a method for dispersing nanoparticles using the dispersant, and a nanoparticle-containing thin film comprising the dispersant. More specifically, the present invention relates to a dispersant which includes a hydrophobic moiety having an affinity for capping ligands bound to the surfaces of nanoparticles and a hydrophilic moiety including a polyethylene glycol derivative structurally similar to an epoxide group; a method for dispersing nanoparticles by inserting the dispersant between capping ligands bound to the surfaces of the nanoparticles, to allow the surfaces of the nanoparticles to have an affinity for an epoxide group, thereby improving the dispersibility of the nanoparticles in a polymer matrix containing an epoxide group; and a nanoparticle-containing thin film comprising the dispersant.

2. Description of the Related Art

Quantum dots are nanometer-scale semiconductor materials, which exhibit quantum confinement effects. Quantum dots are used to fabricate a variety of electrical and optical devices due to their superior physical, chemical and electrical properties.

Since semiconductor nanoparticles exhibit size-dependent optical properties, they have received a great deal of attention in the fields of optical devices during the past decade. If a stable and hard nanoparticle thin film, comprising nanoparticles well dispersed in a matrix, having suitable optical properties were formed, a light-emitting device comprising the thin film would exhibit a constant luminescence level and high luminescence efficiency.

However, since nanoparticles have a strong tendency to aggregate, they cannot sufficiently exhibit their inherent characteristics. In recent years, attempts have been made to extend the applicability of nanoparticles in the fields of light-emitting devices. For example, approaches aimed at increasing the degree of dispersion of nanoparticles in various polymer matrices are gaining importance.

Epoxy resins containing an epoxide group, as polymer matrices, can be formed into optically transparent solids without any significant shrinkage when cured. Based on this characteristic, epoxy resins are promising candidate materials in various technological applications, such as encapsulation and optical devices.

However, nanoparticles do not tend to dissolve and/or disperse in epoxy resins, in part because epoxy resins have a relatively high viscosity and nanoparticles prepared by wet chemistry techniques, which are commonly employed to prepare nanoparticles, have short-chained capping ligands bound to their surfaces that contain no functional group having an affinity for an epoxide group.

Accordingly, a new type of dispersant, having a long chain and a functional group having an affinity for an epoxide group that is capable of sufficiently dispersing large concentrations of nanoparticles in a polymer matrix (e.g., an epoxy resin) containing an epoxide group without occurrence of aggregates or precipitates, is needed to fabricate light-emitting devices having improved optical properties.

Many processes to improve the dispersibility of nanoparticles have been proposed. For example, processes associated with surface modification to substitute capping ligands bound to the surface of nanoparticles with functional groups having an affinity for solvents or polymer matrices to be used have been attempted.

However, such substitution processes have many drawbacks and limitations. For example, the substitution processes cause damage to the surfaces of the nanoparticles, leading to poor efficiency, and are dependent upon the kind of capping ligands strongly bound to the surfaces of the nanoparticles because the functional groups must have a higher binding force than the capping ligands. Further, capping ligands separated from the nanoparticles are not readily removed.

To solve these problems, a method for modifying gold nanoparticles to make the nanoparticles water-soluble was recently reported (SCIENCE VOL 304 23 Apr. (2004)). According to this method, a dispersant having a hydrophilic moiety is inserted between hydrophobic capping ligands bound to the surface of the gold nanoparticles instead of by substituting the capping ligands with a functional group.

Although the method is successful in modifying gold nanoparticles to be water soluble, the report fails to describe a dispersant and a method for dispersing nanoparticles in highly viscous polymer matrices.

U.S. Patent Publication No. 2005/0074551 discloses water-soluble metal nanoparticles coated with a mixed monolayer, which comprises a capture coating component useful for the specific capture of materials and a shielding coating component for elimination of non-specific binding of materials to the capture component, and a process for preparing the water-soluble metal nanoparticles.

However, although this patent publication discloses a process for sufficiently dissolving metal nanoparticles (e.g., gold nanoparticles) in water so that the metal nanoparticles have an affinity for biomolecules (e.g., proteins) requiring aqueous environment for activity, there is no suggestion of a dispersant for sufficiently dispersing the nanoparticles in a polymer matrix, such as an epoxy resin, which would be useful in the fabrication of light-emitting devices.

BRIEF SUMMARY OF THE INVENTION

The present invention overcomes the above-described problems occurring in the prior art, and an aspect of the present invention includes providing a new type of dispersant that is capable of sufficiently dispersing nanoparticles surface-bound with capping ligands in a polymer matrix containing an epoxide group without damage to the surface of the nanoparticles.

Another aspect of the present invention includes providing a method for easily dispersing nanoparticles that are surface-bound with capping ligands in a polymer matrix containing an epoxide group by using the dispersant.

Yet another aspect of the present invention includes providing a nanoparticle-containing thin film with a high luminescence efficiency, which comprises the dispersant.

In accordance with an exemplary embodiment of the present invention, a nanoparticle dispersant is represented by Formula 1 below:

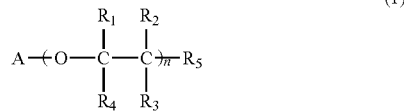

(1)

wherein A is selected from the group consisting of substituted and unsubstituted $C_1$-$C_{30}$ alkyl, $C_1$-$C_{30}$ alkenyl, $C_1$-$C_{30}$ alkynyl, $C_6$-$C_{30}$ aryl, $C_6$-$C_{30}$ arylalkyl, $C_1$-$C_{30}$ heteroalkyl, $C_2$-$C_{30}$ heteroaryl, $C_2$-$C_{30}$ heteroarylalkyl, $C_5$-$C_{30}$ cycloalkyl, and $C_2$-$C_{30}$ heterocycloalkyl groups; $R_1$, $R_2$, $R_3$ and $R_4$ are each independently hydrogen or a methyl group; $R_5$ is selected from the group consisting of —H, —$CH_3$, —OH, —$NH_2$, carboxylic acid and salts thereof, sulfonic acid and salts thereof, and phosphoric acid and salts thereof; and n is an integer from 2 to 45.

In accordance with another exemplary embodiment of the present invention, a method for dispersing nanoparticles in a polymer matrix containing an epoxide group includes inserting the dispersant between capping ligands bound to the surfaces of the nanoparticles.

In accordance with yet another exemplary embodiment of the present invention, a nanoparticle-containing thin film includes nanoparticles surface-bound with capping ligands, the dispersant, and a polymer matrix having an epoxide group.

BRIEF DESCRIPTION OF THE DRAWINGS

The above and other aspects, features, and other advantages of the present invention will be more clearly understood from the following detailed description taken in conjunction with the accompanying drawings, in which:

FIG. 12 shows photoluminescence spectra of the nanoparticles prepared in Comparative Examples 1 through 4.

DETAILED DESCRIPTION OF THE INVENTION

Figure 1:
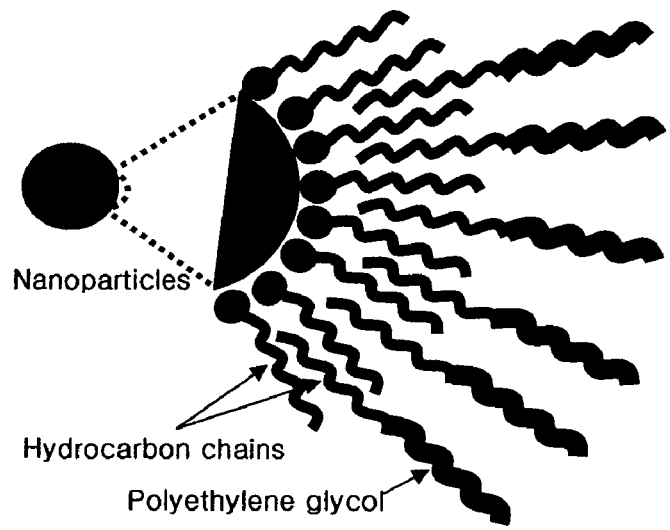
FIG. 1 is a schematic illustration of an exemplary embodiment of a dispersant of the present invention inserted between capping ligands bound to the surface of a nanoparticle.

The present invention will now be described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art.

Capping ligands used herein are materials that are bound to the surfaces of nanoparticles in order to prevent aggregation of the nanoparticles during preparation of the nanoparticles. Since the surfaces of nanoparticles in colloidal form are very unstable, the nanoparticles tend to aggregate. Accordingly, it is necessary to bind materials (i.e. capping ligands), capable of preventing aggregation of the nanoparticles, to the surfaces of the nanoparticles.

Capping ligands generally include a binding group (a head moiety) binding to the surface of a nanoparticle and a hydrophobic alkyl group (a tail moiety). If needed, a hydrophilic functional group may be introduced into the tail moiety. In addition, the capping ligands play a role in determining the size and shape of the nanoparticles based on the kind of capping ligand. For this reason, those skilled in chemical synthesis generally use the expressions "organic capping ligands" and "organic capping molecules", instead of the term "surfactants".

The dispersant for dispersing nanoparticles according to the present invention is generally represented by Formula 1 below:

(1)

wherein A is selected from the group consisting of substituted and unsubstituted $C_1$-$C_{30}$ alkyl, $C_1$-$C_{30}$ alkenyl, $C_1$-$C_{30}$ alkynyl, $C_6$-$C_{30}$ aryl, $C_6$-$C_{30}$ arylalkyl, $C_1$-$C_{30}$ heteroalkyl, $C_2$-$C_{30}$ heteroaryl, $C_2$-$C_{30}$ heteroarylalkyl, $C_5$-$C_{30}$ cycloalkyl, and $C_2$-$C_{30}$ heterocycloalkyl groups; $R_1$, $R_2$, $R_3$ and $R_4$ are each independently hydrogen or a methyl group;

$R_5$ is selected from the group consisting of —H, —CH$_3$, —OH, —NH$_2$, carboxylic acid and salts thereof, sulfonic acid and salts thereof, and phosphoric acid and salts thereof; and n is an integer from 2 to 45.

Specifically, the nanoparticle dispersant of the present invention includes a hydrophobic moiety ("A" of Formula 1) having an affinity for hydrophobic alkyl chains of capping ligands bound to the surfaces of the nanoparticles and a hydrophilic moiety (a portion other than moiety A of Formula 1) having an affinity for an epoxide group of a polymer matrix.

The hydrophobic moiety (A) generally includes a bulky and stiff hydrocarbon chain, and the hydrophilic moiety generally includes polyethylene glycol or a derivative thereof structurally that is similar to an epoxide group. Since both the hydrophobic and hydrophilic moieties are optically pure and do not absorb visible light, the dispersant of the present invention can advantageously be used to disperse nanoparticles without any change in the inherent luminescent properties and deterioration in the luminescence efficiency of the nanoparticles.

As described above, the hydrophobic moiety (A) of the dispersant shown in Formula 1 can be selected from the group consisting of substituted and unsubstituted $C_1$-$C_{30}$ alkyl, $C_1$-$C_{30}$ alkenyl, $C_1$-$C_{30}$ alkynyl, $C_6$-$C_{30}$ aryl, $C_6$-$C_{30}$ arylalkyl, $C_1$-$C_{30}$ heteroalkyl, $C_2$-$C_{30}$ heteroaryl, $C_2$-$C_{30}$ heteroarylalkyl, $C_5$-$C_{30}$ cycloalkyl, and $C_2$-$C_{30}$ heterocycloalkyl groups.

Exemplary alkyl groups include linear and branched methyl, ethyl, propyl, isobutyl, sec-butyl, tert-butyl, pentyl, iso-amyl, and hexyl groups. At least one hydrogen atom included in the alkyl group may be substituted with a halogen atom, a hydroxyl group, a nitro group, a cyano group, an amino group, an amidino group, a hydrazine group, or a hydrazone group.

The terms "alkenyl" and "alkynyl" as used herein refer to groups that contain at least one carbon-carbon double bond and carbon-carbon triple bond at the intermediate or terminal position of the alkyl group defined above, respectively. At least one hydrogen atom included in the alkenyl and alkynyl groups may be substituted with any of the substituents defined above with respect to the "alkyl group".

The term "aryl" as used herein refers to a carbocyclic aromatic system including one or more aromatic rings in which the rings are bonded or fused together in a pendant manner. Exemplary aryl groups include aromatic groups, such as phenyl, naphthyl, and tetrahydronaphthyl groups. At least one hydrogen atom included in the aryl group may be substituted with any of the substituents defined above with respect to the "alkyl group".

The term "arylalkyl" as used herein refers to a group in which hydrogen atoms included in the aryl group defined above are partly substituted with lower alkyl groups, such as methyl, ethyl and propyl radicals. Exemplary arylalkyl groups include benzyl and phenylethyl groups. At least one hydrogen atom included in the arylalkyl group may be substituted with any of the substituents defined above with respect to the "alkyl group".

The term "heteroalkyl" as used herein refers to an alkyl group in which one or more carbon atoms in the main alkyl chain is substituted with a hetero atom (e.g., N, O, P and S).

The term "heteroaryl" as used herein refers to a $C_5$-$C_{30}$ cyclic aromatic system in which one to three hetero atoms selected from N, O, P and S are included, the remaining ring atoms are carbon atoms, and the rings are bonded or fused together in a pendant manner. At least one hydrogen atom included in the heteroaryl group may be substituted with any of the substituents defined above with respect to the "alkyl group".

The term "heteroarylalkyl" as used herein refers to a group in which hydrogen atoms included in the heteroaryl group defined above are partially substituted with lower alkyl groups, such as methyl, ethyl and propyl groups. At least one hydrogen atom included in the heteroarylalkyl group may be substituted with any of the substituents defined above with respect to the "alkyl group".

The term "cycloalkyl", as used herein refers to a monovalent monocyclic system having 5 to 30 carbon atoms. At least one hydrogen atom included in the cycloalkyl group may be substituted with any of the substituents defined above with respect to the "alkyl group".

The term "heterocycloalkyl group" as used herein refers to a $C_5$-$C_{30}$ monovalent monocyclic system in which one to three heteroatoms selected from N, O, P and S are included, and the remaining ring atoms are carbon atoms. At least one hydrogen atom included in the heterocycloalkyl group may be substituted with any of the substituents defined above with respect to the "alkyl group".

The hydrophobic moiety A of the dispersant (Formula 1) according to the present invention has an affinity for the hydrophobic alkyl chains of the capping ligands that are bound to the surfaces of the nanoparticles. Accordingly, when the dispersant is mixed with nanoparticles in an organic solvent, followed by solvent evaporation, the hydrophobic moiety A is easily inserted between the hydrophobic chains of the capping ligands by an interfacial interaction due to van der Waals forces, as shown in FIG. 1. As a result, the nanoparticles are surrounded by more extended hydrophobic hydrocarbon chains and a thicker polyethylene glycol film structurally similar to an epoxide group. That is, a structure having a nanoparticle core and a bilayer shell is formed. The ethylene glycol groups of the polyethylene glycol film spread from the nanoparticles in every direction in a polymer matrix containing an epoxide group, thus preventing collision and aggregation of the nanoparticles.

Since the use of the dispersant according to the present invention eliminates the need for substitution of the capping ligands, damage to the surfaces of the nanoparticles (i.e. occurrence of traps) is prevented so that deterioration of the inherent optical properties of the nanoparticles caused during substitution is decreased or eliminated; and the surfaces of the nanoparticles can be modified to have an affinity for an epoxide group and to include larger amounts of hydrophobic hydrocarbon chains, regardless of the kind of capping ligands bound to the surfaces of the nanoparticles. Accordingly, the dispersant of the present invention has an advantage that even nanoparticles surrounded by short-chained capping molecules can be easily dispersed in a long-chained polymer matrix containing an epoxide group.

Exemplary dispersants of Formula 1 according to the present invention are those wherein n is an integer from 10 to 45 and the ratio of the number of carbon atoms included in hydrophobic moiety A to n is about 2:1 to about 2:3, but is not limited thereto.

As the number of ethylene glycol units in the dispersant of the present invention increases, both the affinity for an epoxide group and the intervals between nanoparticles can be increased. In addition, when the ratio of the length of the hydrophobic hydrocarbon chain moiety and the polyethylene glycol moiety having an affinity for an epoxide group is about 2:1 to about 2:3, the stability of the nanoparticles can be enhanced, leading to an increase in the degree of dispersion of the nanoparticles in a polymer matrix.

Other exemplary dispersants of Formula 1 according to the present invention are those wherein n is an integer from 10 to 45 and hydrophobic moiety A contains one or more double or triple bonds. Still other exemplary dispersants of Formula 1 according to the present invention are those wherein n is an integer from 10 to 45 and hydrophobic moiety A contains one or more benzene rings. Particularly exemplary dispersants of Formula 1 according to the present invention are those wherein the hydrocarbon chain constituting hydrophobic moiety A is side-chained while also containing one or more double bonds, triple bonds, or benzene rings.

When the dispersant of the present invention has a bulky or stiff structure wherein the hydrocarbon chain constituting hydrophobic moiety A contains one or more double bonds, triple bonds, or benzene rings and is side-chained, the dispersant has an increased insertion force. Accordingly, the dispersant of the present invention is effectively inserted between capping ligands of nanoparticles, leading to a further increase in the stability and the degree of dispersion of the nanoparticles.

Specific examples of the dispersant according to the present invention include, but are not limited to, the compounds represented by Formulae 2 to 5 below.

$$C_{18}H_{35}(OCH_2CH_2)_{20}OH \qquad (2)$$

$$C_{18}H_{37}(OCH_2CH_2)_{20}OH \qquad (3)$$

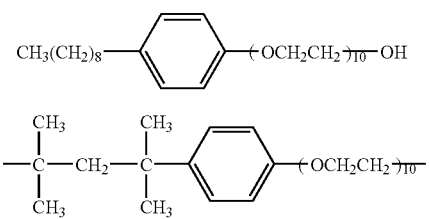

(4)

(5)

Nanoparticles to be dispersed by the dispersant of the present invention are surface-bound with capping ligands, and examples thereof include most nanocrystals, such as metal nanoparticles and semiconductor nanoparticles, which are synthesized by wet chemistry techniques. Specifically, the nanoparticles used in the present invention may be one or more selected from the group consisting of: metal nanoparticles, including Au, Ag, Pt, Pd, Co, Cu and Mo nanoparticles; Group II-VI compound semiconductor nanoparticles, including CdS, CdSe, CdTe, ZnS, ZnSe, ZnTe, HgS, HgSe and HgTe nanoparticles; Group III-V compound semiconductor nanoparticles, including GaN, GaP, GaAs, InP and InAs nanoparticles; and lead-containing nanoparticles, including PbS, PbSe and PbTe nanoparticles. Desirably, luminescent core-shell or alloy semiconductor nanoparticles having a size of less than or equal to about 10 nanometers (nm) are used.

Examples of capping ligands bound to the surface of the nanoparticles include, but are not specially limited to, those having a binding group selected from the group consisting of phosphine oxide, phosphonic acid, carboxylic acid, amine, and thiol; and a hydrophobic alkyl chain.

Non-limiting examples of suitable matrices into which the nanoparticles can be dispersed include epoxy resins, which are mainly used in various technological applications, such as encapsulation and optical devices. Any polymer matrix containing an epoxide group can be used without limitation.

The present invention is also directed to a method for dispersing nanoparticles in a polymer matrix containing an epoxide group. The method generally includes inserting the dispersant of Formula 1 between capping ligands bound to the surface of nanoparticles.

According to the method of the present invention, the dispersibility of the nanoparticles is improved by insertion of the dispersant, instead of by conventional capping ligand-substitution processes. Accordingly, no surface trap occurs during insertion and the optical properties of the nanoparticles are not substantially deteriorated. In addition, the method of the present invention has an advantage that the nanoparticles can be well dispersed in a polymer matrix containing an epoxide group, regardless of the kind of capping ligands bound to the surface of the nanoparticles.

Figure 2:
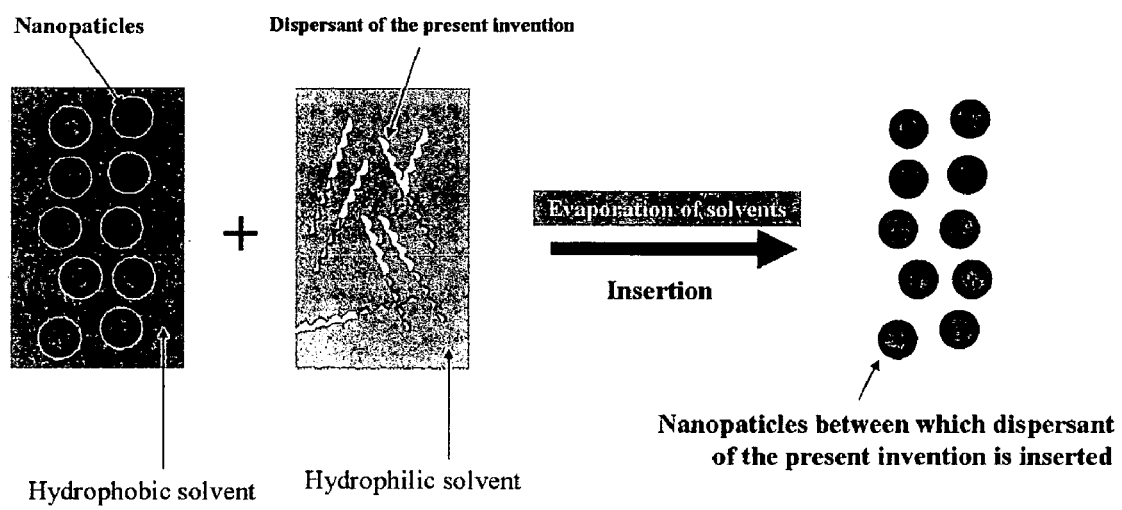
FIG. 2 is a schematic illustration of an exemplary embodiment of a method for preparing nanoparticles between which a dispersant of the present invention is inserted.

The dispersant can be inserted by processes well known in the art to which the present invention pertains. Specifically, an exemplary embodiment of the method of the present invention comprises dispersing nanoparticles surface-bound with capping ligands in a hydrophobic solvent; mixing the solution with the dispersant of the present invention; adding a hydrophilic solvent to the mixture of the solution and the dispersant; stirring the mixture of the solution and the dispersant and the hydrophilic solvent; and sequentially evaporating the hydrophobic and the hydrophilic solvents. FIG. 2 schematically illustrates the procedure of the exemplary embodiment of the method according to the present invention.

In the method of the present invention, the mixing weight ratio of the nanoparticles to the dispersant is desirably about 1:25 to about 1:75, because the use of an excess amount of the dispersant may cause difficulties in curing a polymer matrix.

Non-limiting examples of the hydrophobic solvent include chloroform, hexane, cyclohexene, and the like. Non-limiting examples of the hydrophilic solvent include ethanol, methanol, isopropanol, and the like. In an exemplary embodiment, the boiling point of the hydrophobic solvent is lower than or similar to that of the hydrophilic solvent.

The present invention is also directed to a thin film comprising nanoparticles that are surface-bound with capping ligands, the dispersant, and a polymer matrix containing an epoxide group.

Since the dispersant is inserted between capping ligands bound to the surfaces of the nanoparticles to improve the stability of the nanoparticles and the dispersibility of the nanoparticles in the polymer matrix, the nanoparticles are uniformly dispersed in the polymer matrix without being aggregated even after being cured under particular conditions. Accordingly, the nanoparticle-containing thin film of the present invention is optically transparent and exhibits superior characteristics without substantial deterioration in the optical properties of the nanoparticles themselves. That is, the nanoparticle-containing thin film of the present invention exhibits a superior luminescence efficiency without any change in inherent luminescent properties of the nanoparticles, such as luminescence wavelength and luminescence wavelength distribution.

The nanoparticle-containing thin film of the present invention can be effectively used in a variety of fields, including flash memory devices, DRAMs, hard disks, light-emitting devices and other devices. Particularly, the use of the nanoparticle-containing thin film of the present invention as a light-emitting layer provides light-emitting devices having high luminescence efficiency.

The nanoparticle-containing thin film of the present invention can be produced by processes commonly known in the art to which the present invention belongs. For example, the nanoparticle-containing thin film of the present invention can be produced by mixing the polymer matrix containing an epoxide group with the nanoparticles, stirring the mixture, coating the mixture on a substrate by a general coating technique, and curing the coated substrate at about room temperature to about 200 degrees Celsius (° C.) for more than about 30 minutes.

The substrate on which the nanoparticle-containing thin film is formed can include, for example, glass, ITO-coated glass, quartz, silicon wafers, silica-coated substrates, alumina-coated substrates, and the like. The substrate surface can be pretreated by common techniques before being coated with the mixture of the polymer matrix and the nanoparticles.

The coating can be performed by common coating techniques, including but not limited to, drop casting, spin coating, dip coating, spray coating, flow coating, screen printing, and the like.

The mixing weight ratio of the nanoparticles to the polymer matrix containing the epoxide group is desirably about 1:100 to about 1:1,000, particularly because the amount of the dispersant is proportional to the amount of the nanoparticles used and thus an increased amount of the dispersant may cause difficulties curing the polymer matrix.

Non-limiting examples of the polymer matrix containing the epoxide group include, but are not limited to, epoxy resins having appropriate optical properties. Any polymer containing an epoxide group can be used without limitation.

In an exemplary embodiment, the nanoparticle-containing thin film has a thickness of about 50 micrometers (μm) to about 200 μm.

Hereinafter, the present invention will be described in more detail with reference to the following examples, including experimental examples. It is to be understood, however, that these examples are for illustrative purposes only and are not to be construed as limiting the scope of the present invention.

Example 1

20 milliters (mL) of trioctylamine (TOA), 1.6 millimiles (mmol) of cadmium oxide (CdO) and 6.4 mmol of oleic acid (OA) were reacted under nitrogen. As the reaction temperature increased, the red cadmium oxide present in the reaction solution turned pale. The reaction solution was maintained at a temperature of 300° C. for 30 minutes or more until it became transparent. At this time, 1 mL of a 0.2 mole per liter (M) Se-trioctylphosphine (Se-TOP) complex solution was added to the reaction solution, and the mixture was allowed to react at 300° C. for 90 seconds. The reaction mixture turned orange, red, dark red and the like, sequentially, with the passage of time. Thereafter, a 0.2M S-trioctylphosphine (S-TOP) complex solution was added dropwise at a rate of about 1 mL per minute to the reaction mixture. Ethanol as a non-solvent was added to the mixture, followed by centrifugation, giving oleic acid-capped CsSe/CdS nanoparticles as precipitates, which emitted light at 604 nm.

10 milligrams (mg) of the oleic acid-capped CdSe/CdS nanoparticles were dispersed in 1 mL of chloroform, and then 500 mg of the dispersant of Formula 2, $C_{18}H_{35}(OCH_2CH_2)_{20}OH$, (Brij98, Aldrich Chemicals) were added thereto, followed by the addition of 1 mL of ethanol.

The chloroform and ethanol were sequentially evaporated under vacuum to complete insertion of the dispersant between the nanoparticles. As a result, CdSe/CdS nanoparticles between which the dispersant was inserted were prepared.

Then, 500 mg of the dispersed CdSe/CdS nanoparticles were mixed with 1 mL of an epoxy resin and stirred. The mixture was dropped onto a clean quartz slide, and another quartz slide was laid thereon. After two cover glasses (thickness: about 150 μm) were inserted next to both sides of the film to adjust the thickness of the film, the quartz slides were fixed using a clip. The film was cured at 150° C. for one hour to produce an optically transparent nanoparticle-containing thin film sample having a thickness of 139 μm.

Examples 2 to 6

Dispersed CdSe/CdS nanoparticles were prepared in the same manner as in Example 1, except that each of the compounds shown in Table 1 as the dispersants of the present invention was used.

TABLE 1

| Example No. | Dispersant | Trade Mark | Manufacturer |
|---|---|---|---|
| 2 | $C_{18}H_{37}(OCH_2CH_2)_{20}OH$ | Brij78 | Aldrich Chemicals |
| 3 | 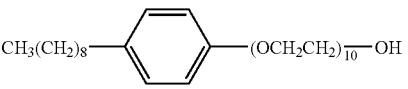 | Tergitol NP-9 | |
| 4 | 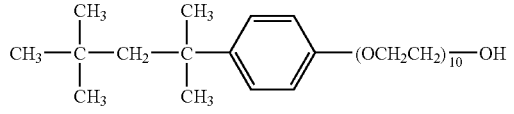 | TX-100 | |
| 5 | $CH_{16}H_{33}(OCH_2CH_2)_2OH$ | Brij52 | |
| 6 |  | Bri56 | |

Comparative Example 1

A nanoparticle-containing thin film sample was produced in the same manner as in Example 1, except that oleic acid (OA)-capped CdSe/CdS nanoparticles were used without using a dispersant.

Then, 10 mg of the oleic acid-capped CdSe/CdS nanoparticles were mixed with 1 mL of an epoxy resin and stirred. The mixture was dropped onto a clean quartz slide, and another quartz slide was laid thereon. After two cover glasses (thickness: about 150 μm) were inserted next to both sides of the film to adjust the thickness of the film, the quartz slides were fixed using a clip. The film was cured at 150° C. for one hour to produce a nanoparticle-containing thin film sample having a thickness of about 139 μm.

Comparative Examples 2 to 4

10 mg of the oleic acid-capped CdSe/CdS nanoparticles prepared in Comparative Example 1 were dispersed in 1 mL of toluene. To the dispersion were added each of the materials shown in Table 2 in the same amount as the oleic acid. The mixture was stirred at room temperature for 3 days, giving CdSe/CdS nanoparticles capped with amine, pyridine and thiol by substitution, respectively.

TABLE 2

| Comparative Example No. | Substituents |
|---|---|
| 2 | Oleylamine |
| 3 | Pyridine |
| 4 | Octane thiol |

Experimental Example 1

Determination of Insertion of Dispersant and Measurement of Degree of Dispersion of the Nanoparticles To determine whether or not the dispersant of the present invention was inserted between the nanoparticles, samples from Example 1 and Comparative Example 1 were independently dispersed in ethanol. The degree of dispersion of the nanoparticles was visually observed. Specifically, the degree of dispersion was evaluated by placing an object behind the solutions and observing whether or not the object was seen through the solution.

Figure 3:
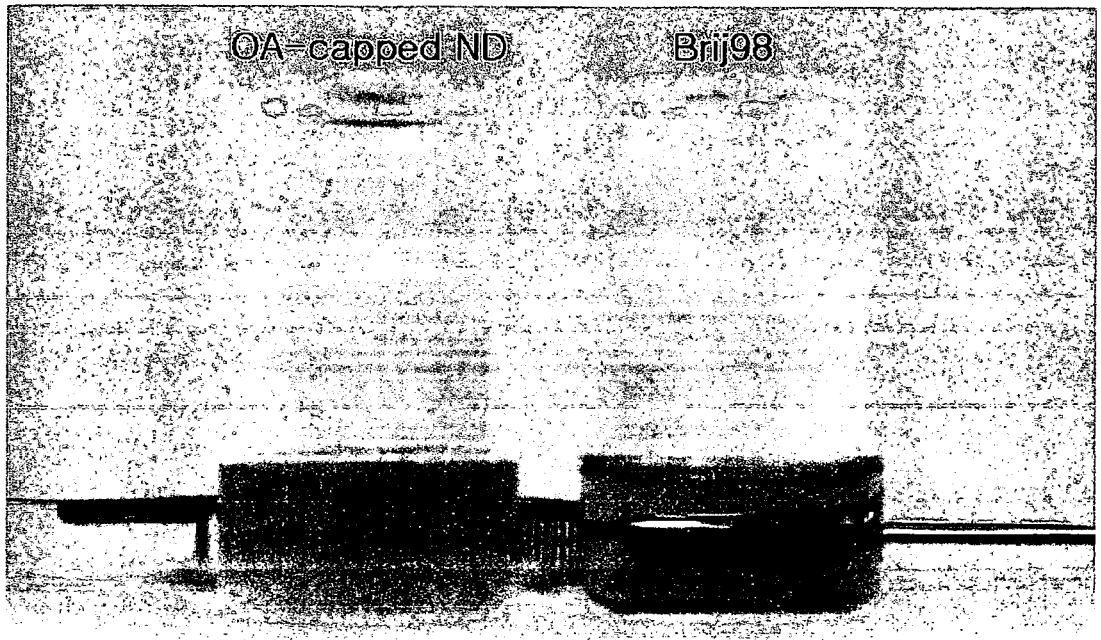
FIG. 3 is a photograph illustrating the degree of dispersion of the nanoparticles prepared in Example 1 in ethanol and that of the nanoparticles prepared in Comparative Example 1 in ethanol.

The observation results are shown in FIG. 3, which is a photograph illustrating the degree of dispersion of the nanoparticles prepared in Example 1 in ethanol and that of the nanoparticles prepared in Comparative Example 1 in ethanol. The photograph shows that the solution of Example 1 is transparent enough to reveal the object through the solution, whereas the solution of Comparative Example 1 is opaque and the object is not visible through the solution. These observations indicated that the dispersant of the present invention was properly inserted between the capping ligands of the nanoparticles and that the nanoparticles were well dispersed in ethanol without aggregating.

Experimental Example 2

Measurement of Degree of Dispersion of the Nanoparticles as a Function of the Number of Ethylene Glycol Units in the Dispersant To determine the degree of dispersion of the nanoparticles as a function of the number of ethylene glycol units in the hydrophilic moiety of the dispersant, the nanoparticle samples of Examples 1 and 5 were dispersed in ethanol. The degree of dispersion was visually observed.

Figure 4:
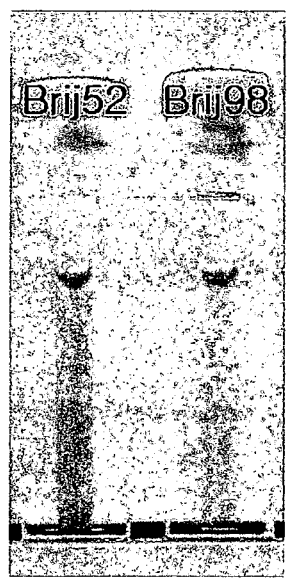
FIG. 4 is a photograph showing the degree of dispersion of the nanoparticles as a function of the number of ethylene glycol units constituting the hydrophilic moiety of the dispersant of the present invention.

The observation results are shown in FIG. 4, which is a photograph showing the degree of dispersion of the nanoparticles as a function of the number of ethylene glycol units in the hydrophilic moiety of the dispersant. The photograph shows that the nanoparticles between which the dispersant (Brij98) containing 20 ethylene glycol units was inserted (i.e., Example 1) are well dispersed in ethanol and thus transparent, whereas the nanoparticles between which the dispersant (Brij52) containing 2 ethylene glycol units was inserted (i.e., Example 5) was more opaque.

Figure 5:
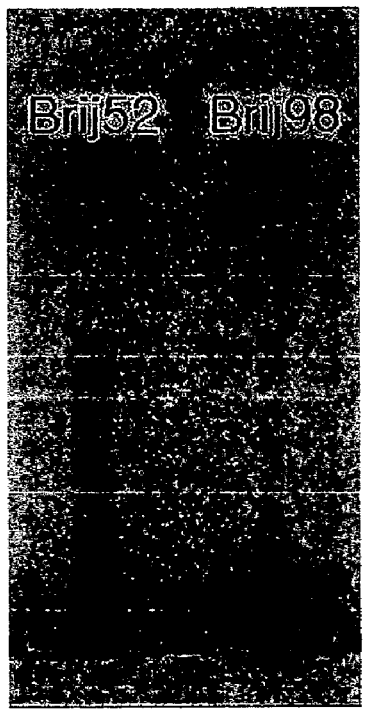
FIG. 5 is a photograph showing the degree of dispersion of the nanoparticles as a function of the number of ethylene glycol units constituting the hydrophilic moiety of the dispersant of the present invention, as indicated by the luminescence of the nanoparticles under a UV lamp.

Further, the luminescence of each of the solutions was measured under a UV lamp at 365 nm. The results are shown in FIG. 5, which is a photograph showing the degree of dispersion of the nanoparticles as a function of the number of ethylene glycol units in the hydrophilic moiety of the dispersants, under a UV lamp. The photograph shows that the nanoparticles between which the dispersant (Brij98) containing 20 ethylene glycol units was inserted (i.e., Example 1) emitted a more bright red fluorescence than the nanoparticles between which the dispersant (Brij52) containing 2 ethylene glycol units was inserted (i.e., Example 5).

Experimental Example 3

Measurement of Insertion Force and Degree of Dispersion of the Nanoparticles as a Function of the Presence or Absence of a Double Bond within the Hydrocarbon Chain of the Dispersant To determine the insertion force and degree of dispersion of the nanoparticles as a function of the presence or absence of a double bond within a hydrocarbon chain in the hydrophobic moiety of the dispersant, two dispersants containing the same number of carbon atoms and ethylene glycol units within a hydrocarbon chain were used, except that one of the dispersants had one double bond and the other had no double bond. The experiments were conducted by the following procedure. The nanoparticle samples of Examples 1 and 2 were dispersed in ethanol, and the luminescence of the solutions was measured under a UV lamp at 365 nm.

Figure 6:
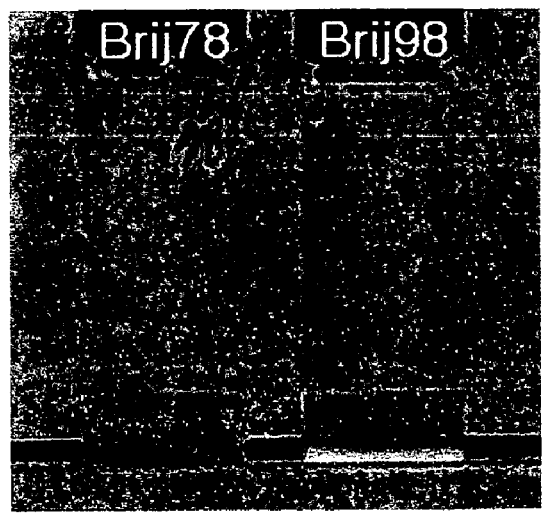
FIG. 6 is a photograph showing the insertion force and the degree of dispersion of the nanoparticles as a function of the presence or absence of a double bond within a hydrocarbon chain constituting the hydrophobic moiety of the dispersant of the present invention, as indicated by the luminescence of the nanoparticles under a UV lamp.

The results are shown in FIG. 6, which is a photograph showing the insertion force and the degree of dispersion of the nanoparticles as a function of the presence or absence of a double bond within a hydrocarbon chain in the hydrophobic moiety of the dispersant under a UV lamp. The photograph shows that the nanoparticles between which the dispersant (Brij98) containing a double bond within the hydrocarbon chain was inserted (Example 1) emitted a more bright red fluorescence when compared to the nanoparticles between which the dispersant (Brij78) containing no double bond within the hydrocarbon chain was inserted (Example 2). The results of the experiments indicated that the presence of a double bond within a hydrocarbon chain increases the insertion force of the dispersant, thus improving the degree of dispersion of the nanoparticles.

Experimental Example 4

Measurement of Insertion Force and Degree of Dispersion of the Nanoparticles as a Function of the Bulkiness and Stiffness of the Hydrocarbon Chain of the Dispersant To determine the insertion force and the degree of dispersion of the nanoparticles as a function of the bulkiness and stiffness of a hydrocarbon chain in the hydrophobic moiety of the dispersant, dispersants containing the same number of ethylene glycol units within a hydrocarbon chain but having different structures were used. The experiments were conducted by the following procedure. After each of the nanoparticle samples prepared in Examples 3, 4, and 6 was dispersed in ethanol, the degree of dispersion of the nanoparticles was visually observed.

Figure 7:
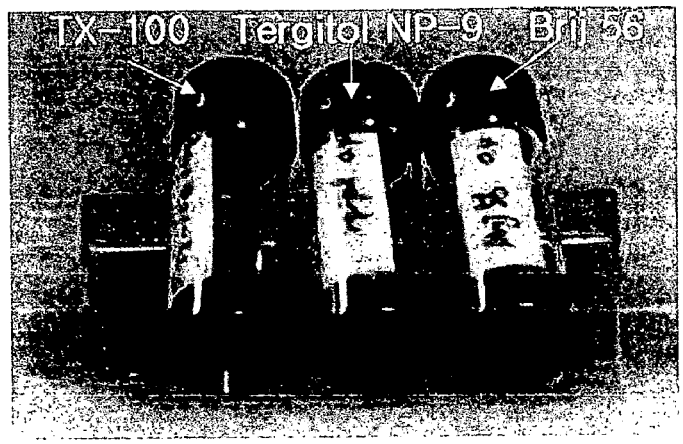
FIG. 7 is a photograph showing the insertion force and the degree of dispersion of the nanoparticles as a function of the bulkiness and stiffness of a hydrocarbon chain constituting the hydrophobic moiety of the dispersant of the present invention.

The observation results are shown in FIG. 7, which is a photograph showing the insertion force and the degree of dispersion of the nanoparticles as a function of the bulkiness and stiffness of the hydrocarbon chain in the hydrophobic moiety of the dispersant. The dark arrows in FIG. 7 point to aggregated and precipitated nanoparticles in the two samples on the right of the photograph. Referring to FIG. 7, the amounts of the aggregated and precipitated nanoparticles increase according to the following order: the sample having the nanoparticles between which the dispersant (Brij56) including a linear hydrocarbon chain was inserted (Example 6); the sample having the nanoparticles between which the dispersant (Tergitol NP-9) containing a benzene ring in a hydrocarbon chain was inserted (Example 3); and the sample having the nanoparticles between which the dispersant (TX-100) containing a benzene ring in a branched alkyl chain was inserted (Example 4). These experimental results indicate that as the hydrocarbon chain increases in bulk and stiffness due to the presence of a benzene ring and a side chain, the insertion force of the dispersant increases and thus the degree of dispersion of the nanoparticles is improved.

Experimental Example 5

Measurement of Degree of Dispersion of the Nanoparticles within an Epoxy Resin

To determine the degree of dispersion of the nanoparticles within an epoxy resin as a function of the structure of the dispersant, each of the nanoparticle samples prepared in Examples 1 through 6 was dispersed in an epoxy resin and passed through a 200 μm syringe filter. The degree of dispersion of the nanoparticles was evaluated, and characterized using the following criteria:

"Good": The mixture of the nanoparticles and the epoxy resin was completely passed through the filter.

"Moderate": The mixture was partially passed through the filter.

"Bad": The mixture was not substantially passed through the filter.

The results are shown in Table 3 below.

TABLE 3

| Example No. (Dispersant) | Number of carbon atoms in hydrocarbon chain | Number of ethylene glycol units | Structural characteristics | Degree of dispersion |
|---|---|---|---|---|
| Example 5 (Brij52) | 16 | 2 | Linear | Bad |
| Example 6 (Brij56) | 16 | 10 | Linear | Bad |
| Example 3 (Tergitol NP-9) | 15 | 10 | Linear, benzene ring | Moderate |
| Example 4 (TX-100) | 14 | 10 | Bulky, benzene ring | Good |
| Example 2 (Brij78) | 18 | 20 | Linear | Moderate |
| Example 1 (Brij98) | 18 | 20 | Linear, double bond | Good |

From the results of Table 3, it was concluded that due to the presence of 10 or more ethylene glycol units, one or more double bonds, one or more triple bonds, one or more benzene rings, or one or more side chains in the hydrocarbon chains of the dispersant, the insertion force into the nanoparticles increased and thus the dispersibility of the nanoparticles improved.

Experimental Example 6

Evaluation of Characteristics of Nanoparticle-Containing Thin Films (1) Evaluation of Transparency To determine the transparency of the nanoparticle-containing thin film samples produced in Example 1 and Comparative Example 1, a striped paper was placed behind the thin film samples and then it was determined whether or not the stripes were seen through the thin film samples.

Figure 8:
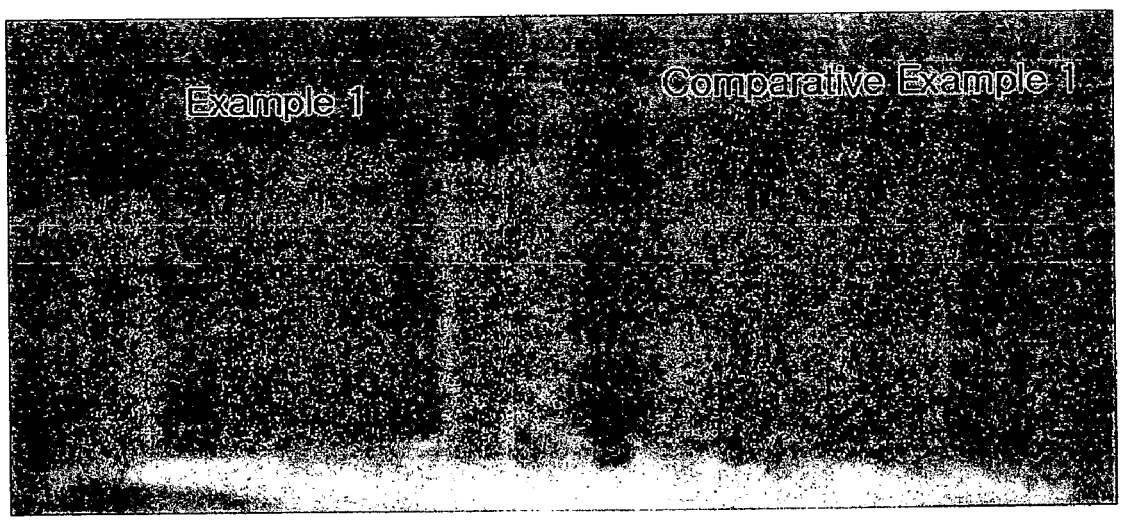
FIG. 8 is a photograph illustrating the transparency of the nanoparticle-containing thin film sample produced in Example 1 and that of a nanoparticle-containing thin film sample produced in Comparative Example 1.

The results are shown in FIG. 8, which is a photograph illustrating the transparency of the nanoparticle-containing thin film samples produced in Example 1 and Comparative Example 1. The photograph indicates that, because the stripes are distinctly visible, the thin film sample produced in Example 1 is transparent, whereas, because the stripes are not visible, the thin film sample produced in Comparative Example 1 is opaque.

Further, after a page from a book was placed behind the nanoparticle-containing thin film samples produced in Example 1 and Comparative Example 1, it was determined whether letters written on the page of the book could be seen through the nanoparticle thin film samples. A reference sample of a thin film of only the epoxy resin was used for comparison.

Figure 9:
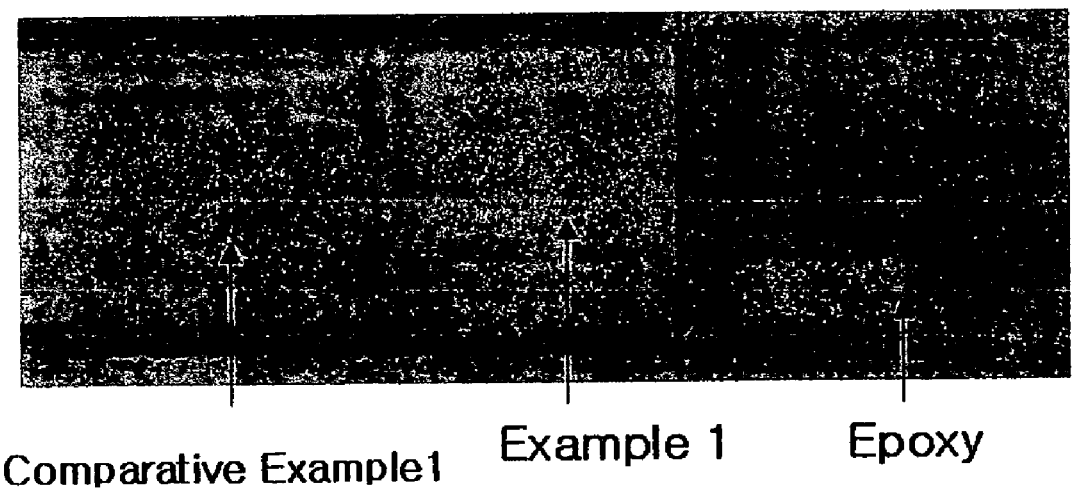
FIG. 9 is a photograph illustrating the transparency of the nanoparticle-containing thin film samples produced in Example 1 and Comparative Example 1 as well as that of an epoxy resin thin film sample.

The results are shown in FIG. 9, which is a photograph illustrating the transparency of the nanoparticle-containing thin film samples produced in Example 1 and Comparative Example 1, as well as the epoxy resin thin film sample. Referring to FIG. 9, the transparency of the nanoparticle-containing thin film sample produced in Example 1 is substantially identical to that of the thin film sample of only the epoxy resin. That is, letters written on the page of the book are clearly observed through these two thin film samples. In contrast, since letters written on the page of the book are not visible, the nanoparticle-containing thin film sample produced in Comparative Example 1 is opaque.

(2) Determination of Aggregation of Nanoparticles

Figure 10:
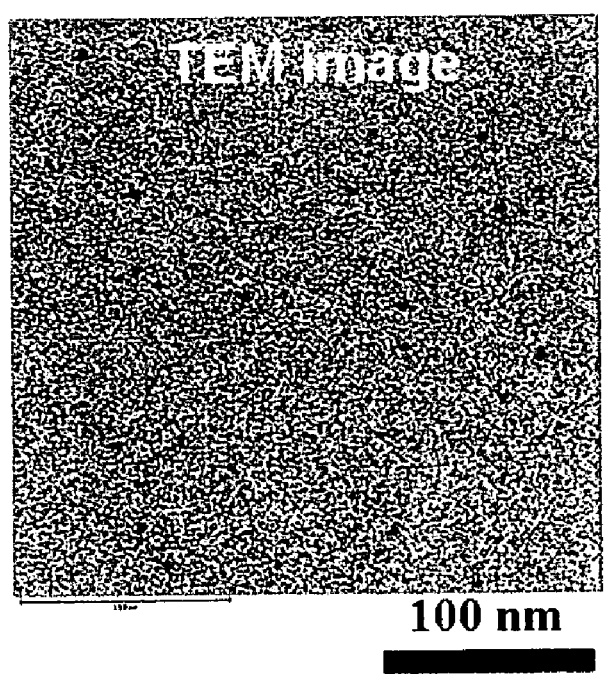
FIG. 10 is a transmission electron microscopy (TEM) image of the nanoparticle-containing thin film sample produced in Example 1.

The nanoparticle-containing thin film sample produced in Example 1 was cut to a thickness of about 90 nm using a focused ion beam (FIB) and observed under a transmission electron microscope (TEM) to determine whether the nanoparticles were aggregated or not. The results are shown in FIG. 10, which is a TEM image of the nanoparticle-containing thin film sample produced in Example 1. The image reveals that no aggregation of nanoparticles occurs in the thin film sample produced in Example 1, indicating that the nanoparticles between which the dispersant of the present invention was inserted are well dispersed in the epoxy resin.

(3) Evaluation of Luminescent Properties

Figure 11:
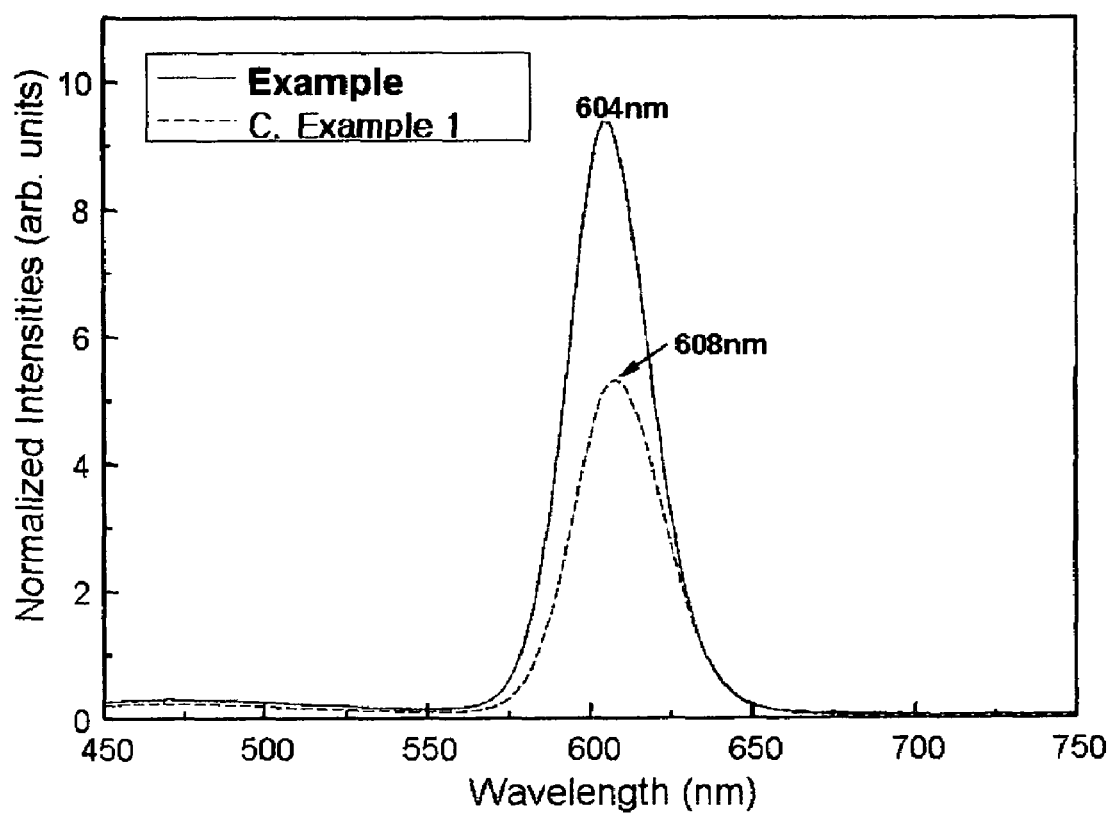
FIG. 11 shows photoluminescence spectra of the nanoparticle-containing thin film samples prepared in Example 1 and Comparative Example 1.

The photoluminescence spectra of the nanoparticle-containing thin film samples produced in Example 1 and Comparative Example 1 were measured, and the results are shown in FIG. 11. The data were normalized by dividing the integral value of the spectra by the absorbance at 410 nm.

The spectra of FIG. 11 reveal that the thin film sample produced in Example 1 has a peak luminescence wavelength of 604 nm and there is no difference in comparison with the inherent luminescence wavelength of CdSe/CdS nanoparticles. In contrast, the thin film sample produced in Comparative Example 1 containing no dispersant has a peak luminescence wavelength of 608 nm, indicating the occurrence of a red shift. These results suggest that aggregation of nanoparticles occurred in the thin film sample produced in Comparative Example 1.

The luminescence intensity of the thin film sample produced in Comparative Example 1 was measured to be 63% of that of the thin film sample produced in Example 1. This demonstrates that the use of the dispersant according to the present invention enables the production of nanoparticle-containing thin films having high luminescence efficiency.

Experimental Example 7

Measurement of Luminescence Spectra of the Nanoparticles Prepared in Comparative Examples 1 to 4

Each of the nanoparticle samples prepared in Comparative Examples 1 through 4 was dispersed in toluene. The nanoparticles were excited at 410 nm to measure the photoluminescence spectra. The results are shown in FIG. 12. Referring to FIG. 12, when oleic acid capped on the surface of the nanoparticles is substituted with functional groups (i.e., amine, pyridine and thiol), the luminescence efficiency greatly decreases. This demonstrates the occurrence of damage to the surfaces of the nanoparticles during substitution of the oleic acid groups with the functional groups. Further, a variable decrease in the luminescence efficiency was observed, indicating that the degree of deterioration caused by substitution of the functional groups depends on the kind of capping ligands being substituted on the surface of the nanoparticles.

These experimental results indicate that conventional substitution processes for substituting capping ligands with functional groups cause many problems (e.g., damage to the surface of nanoparticles and deterioration in luminescence efficiency) during dispersion of the nanoparticles surface-bound with the capping ligands in a polymer matrix containing an epoxide group; and these problems can be solved by the new dispersants of the present invention.

As apparent from the above description, the use of the dispersant according to the present invention enables stable, uniform dispersion of hydrophobic luminescent nanoparticles in a polymer matrix containing an epoxide group, regardless of the kind of capping ligands bound to the surface of the nanoparticles, without causing damage to the surface of the nanoparticles. Therefore, by using the dispersant of the present invention, nanoparticle thin films and light-emitting devices having improved luminescence efficiency can be produced without any change in the inherent luminescent properties of nanoparticles.

Although the present invention has been described with reference to the foregoing exemplary embodiments, these exemplary embodiments do not serve to limit the scope of the present invention. Accordingly, those skilled in the art to which the present invention pertains will appreciate that various modifications, additions and substitutions are possible, without departing from the scope and spirit of the accompanying claims.

What is claimed is:

1. A nanoparticle composition comprising nanoparticles that are surface-bound with capping ligands and a dispersant composition represented by Formula 1 below:

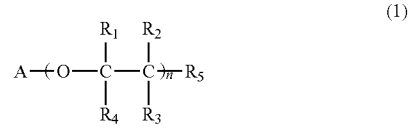

wherein

A is selected from the group consisting of substituted and unsubstituted $C_1$-$C_{30}$ alkyl, $C_1$-$C_{30}$ alkenyl, $C_1$-$C_{30}$ alkynyl, $C_6$-$C_{30}$ aryl, $C_6$-$C_{30}$ arylalkyl, $C_1$-$C_{30}$ heteroalkyl, $C_2$-$C_{30}$ heteroaryl, $C_2$-$C_{30}$ heteroarylalkyl, $C_5$-$C_{30}$ cycloalkyl, and $C_2$-$C_{30}$ heterocycloalkyl groups;

$R_1$, $R_2$, $R_3$ and $R_4$ are each independently hydrogen or a methyl group;

$R_5$ is selected from the group consisting of —H, —$CH_3$, —OH, —$NH_2$, carboxylic acid and salts thereof, sulfonic acid and salts thereof, and phosphoric acid and salts thereof; and n is an integer from 2 to 45.

2. The composition according to claim 1, wherein the nanoparticle composition is dispersed in a polymer matrix.

3. The composition according to claim 1, wherein n is an integer from 10 to 45 and a ratio of a number of carbon atoms in A to n is about 2:1 to about 2:3.

4. The composition according to claim 1, wherein n is an integer from 10 to 45 and A comprises one or more double or triple bonds.

5. The composition according to claim 1, wherein n is an integer from 10 to 45 and A comprises one or more benzene rings.

6. The composition according to claim 1, wherein the dispersant is a compound represented by any one of Formulae 2 to 5 below:

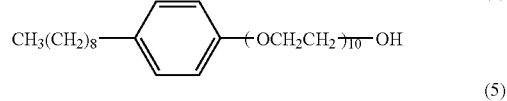

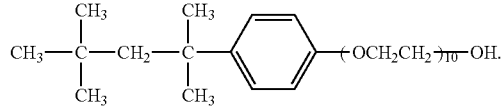

7. The composition according to claim 1, wherein the nanoparticles are one or more selected from the group consisting of metal nanoparticles, Group II-VI compound semiconductor nanoparticles, Group III-V compound semiconductor nanoparticles, and lead-containing nanoparticles.

8. The composition according to claim 7, wherein the metal nanoparticles are selected from the group consisting of Au, Ag, Pt, Pd, Co, Cu, and Mo.

9. The composition according to claim 7, wherein the Group II-VI compound semiconductor nanoparticles are selected from the group consisting of CdS, CdSe, CdTe, ZnS, ZnSe, ZnTe, HgS, HgSe, and HgTe.

10. The composition according to claim 7, wherein the Group III-V compound semiconductor nanoparticles are selected from the group consisting of GaN, GaP, GaAs, InP and InAs.

11. The nanoparticle composition according to claim 7, wherein the lead-containing nanoparticles are selected from the group consisting of PbS, PbSe and PbTe.

12. The nanoparticle composition according to claim 1, wherein the nanoparticles are luminescent core-shell or alloy semiconductor nanoparticles having a size of about 1 nanometer to about 10 nanometers.

13. The nanoparticle composition according to claim 1, wherein the capping ligands comprise:
a binding group selected from the group consisting of phosphine oxide, phosphonic acid, carboxylic acid, amine and thiol; and
a hydrophobic alkyl chain.

14. The nanoparticle composition according to claim 2, wherein the polymer matrix comprises the epoxide group.

15. A method for dispersing nanoparticles in a polymer matrix comprising mixing the nanoparticle composition according to claim 1 into the polymer matrix.

16. The method according to claim 15, wherein the method comprises:
dispersing nanoparticles surface-bound with capping ligands in a hydrophobic solvent;
mixing the dispersed nanoparticles and hydrophobic solvent with the dispersant composition;
adding a hydrophilic solvent to the mixture comprising the dispersed nanoparticles, hydrophobic solvent, and the dispersant composition;
stirring the mixture comprising the dispersed nanoparticles, hydrophobic solvent, dispersant composition, and hydrophilic solvent;
sequentially evaporating the hydrophobic and the hydrophilic solvents forming the nanoparticle composition;
and mixing the nanoparticle composition into the polymer matrix.

17. The method according to claim 16, wherein a weight ratio of the nanoparticles to the dispersant composition is about 1:25 to about 1:75.

18. The method according to claim 16, wherein the hydrophobic solvent is selected from the group consisting of chloroform, hexane, cyclohexane, and mixtures thereof.

19. The method according to claim 16, wherein the hydrophilic solvent is selected from the group consisting of ethanol, methanol, isopropanol, and mixtures thereof.

20. A nanoparticle containing thin film, comprising the nanoparticle composition according to claim 1, and a polymer matrix.

21. The nanoparticle-containing thin film according to claim 20, wherein the polymer matrix comprises an epoxide group.

22. A light-emitting device, comprising the nanoparticle-containing thin film according to claim 20 as a light-emitting layer.

23. The nanoparticle composition according to claim 1, wherein the nanoparticle composition is dispersed in a polymer matrix comprising an epoxide group.

24. The nanoparticle composition according to claim 14, wherein the polymer matrix comprising the epoxide group is an epoxy resin.

25. A method for dispersing nanoparticles in a polymer matrix, comprising mixing the nanoparticle composition according to claim 1 into the polymer matrix having an epoxide group.

26. The method according to claim 15, wherein the method comprises:
dispersing nanoparticles surface-bound with capping ligands in a hydrophobic solvent;
mixing the dispersed nanoparticles and hydrophobic solvent with the dispersant;
adding a hydrophilic solvent to the mixture comprising the dispersed nanoparticles, hydrophobic solvent, and the dispersant;
stirring the mixture comprising the dispersed nanoparticles, hydrophobic solvent, dispersant, and hydrophilic solvent;
sequentially evaporating the hydrophobic and the hydrophilic solvents forming the nanoparticle composition;
and mixing the nanoparticle composition into the polymer matrix having an epoxide group.

27. A nanoparticle containing thin film, comprising the nanoparticle composition according to claim 1, and a polymer matrix comprising an epoxide group.

28. The nanoparticle-containing thin film according to claim 27, wherein the polymer matrix comprising the epoxide group is an epoxy resin.

* * * * *